US006871387B2

(12) United States Patent
Cheng et al.

(10) Patent No.: US 6,871,387 B2
(45) Date of Patent: Mar. 29, 2005

(54) ALLIGATOR CLIP STRUCTURE

(76) Inventors: Wen Tsung Cheng, No. 78 Chao-Chou St., Taoyuan (TW); Wen Ho Cheng, No. 78, Chao-Chou St., Taoyuan (TW)

( * ) Notice: Subject to any disclaimer, the term of this patent is extended or adjusted under 35 U.S.C. 154(b) by 31 days.

(21) Appl. No.: 10/423,959

(22) Filed: Apr. 28, 2003

(65) Prior Publication Data

US 2004/0172795 A1 Sep. 9, 2004

(30) Foreign Application Priority Data

Mar. 7, 2003 (TW) ...................................... 92203527 U

(51) Int. Cl.[7] ......................... F16B 21/00; H01R 11/00; H01R 11/24

(52) U.S. Cl. ........................... 24/499; 24/508; 439/504; 439/759; 439/829

(58) Field of Search ................................. 439/504, 506, 439/827, 759; 24/499, 327, 500, 589, 508, 509, 532; 320/105

(56) References Cited

U.S. PATENT DOCUMENTS 1,366,799 A * 1/1921 Hartung ...................... 439/829
3,008,114 A * 11/1961 Adkins ....................... 439/829
3,267,452 A * 8/1966 Wolf .......................... 439/506
4,453,791 A * 6/1984 Ledbetter .................... 439/504
4,620,767 A * 11/1986 Woolf ........................ 439/504
4,815,991 A * 3/1989 Bakke ........................ 439/759
4,826,457 A * 5/1989 Varatta ....................... 439/759
4,929,199 A * 5/1990 McKinnon .................. 439/759
5,002,508 A * 3/1991 Craveiro ..................... 439/759

* cited by examiner

*Primary Examiner*—Robert J. Sandy

(57) ABSTRACT

An alligator clip with an improved structure including a first and a second clip members connected to each other by a pivot pin is disclosed. A resilient member is installed on the pivot pin with two opposite ends in contact against the interior surfaces of the first and second members. The front ends of the first and second clip members are used to clip the positive/negative electrode of the car battery. A securing member formed from the bottom end of the first clip member, including a through hole each on two opposite ends to wrap a power cord so that two through holes are aligned to receive a fixture to secure the securing member on the power cord.

4 Claims, 5 Drawing Sheets

ALLIGATOR CLIP STRUCTURE

BACKGROUND OF THE INVENTION

The present invention relates to an alligator clip structure and, more particularly, the present invention relates to a clip structure used to clip a car battery having improved integral connection strength.

A typical alligator clip used to clip a car battery is illustrated in FIG. 1. The alligator clip includes a first clip member 10, a second clip member 11, a resilient member 12, a power cord 13 and a pivot pin 14. The pivot pin 14 is used to connect the first and second clip members 10 and 11. The resilient member 12 furnished on the pivot pin 14 allows the alligator clip capably to clip the positive/negative electrode of the car battery (not shown).

The bottom end of first clip member 10 forms a securing member 101. The securing member 101 can be bent to be mounted on the power code 13. Slightly bigger than the securing member 101, an insulation sleeve 131 is located at a front end of the power code 131.

The structure of the above conventional alligator clip utilizes the securing member 101 formed from the first clip member 10 to wrap the power code 13, and then utilize the insulation sleeve 131 to fix the power code 13 to the bottom end of the first clip member 10 to prevent loose connection. The round shapes of both the power code 13 and the insulation sleeve 131 could easily cause the disconnection of the power code 13 and result in the poor connectivity and overuse problems.

Therefore, the above alligator clip structure use to clip the car battery has drawbacks in practical application and thus need to be improved.

Having years of working experience in this particular field, the inventor has developed an improved structure for alligator clip to resolve the drawbacks of the conventional alligator clip.

BRIEF SUMMARY OF THE INVENTION

The present invention provides an alligator clip with an improved structure, which is suitable for use as a clipping tool for the car battery. A screw or other fixture is further utilized to enhance the integral connection strength. Meanwhile, the improved alligator clip structure also provides the convenience of quicker disassemble, quicker assemble and easier power code replacement.

The alligator clip of the present invention includes a first and a second clip members connected to each other by a pivot pin. A resilient member is installed on the pivot pin with two opposite ends in contact against the interior surfaces of the first and second members. The front ends of the first and second clip members are used to clip a positive/negative electrode of a car battery. A securing member formed from the bottom end of the first clip member, comprising a through hole each on two opposite ends to wrap a power cord so that two through holes are aligned to receive a fixture to secure the securing member on the power cord.

BRIEF DESCRIPTION OF THE DRAWINGS

These, as well as other features of the present invention will become apparent upon reference to the drawings wherein.

DETAILED DESCRIPTION OF THE INVENTION

Figure 1:
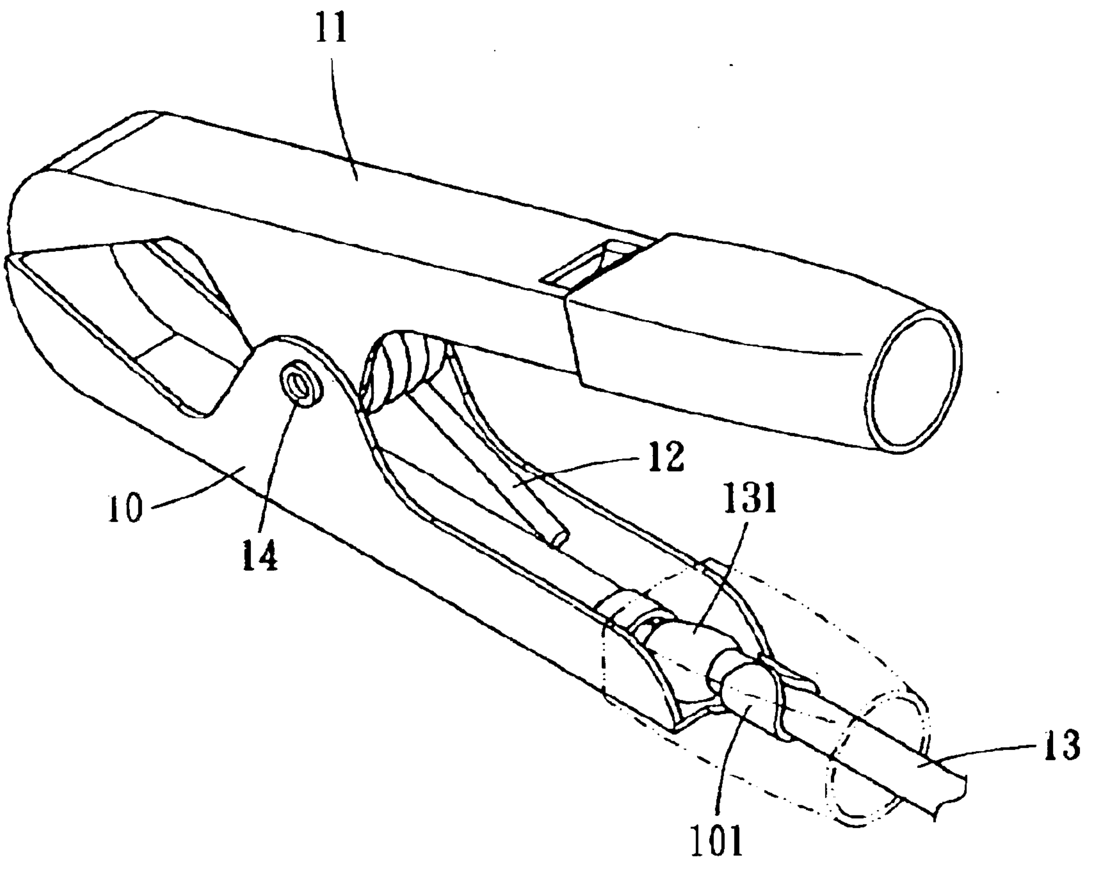
FIG. 1 PRIOR ART
FIG. 1 shows a perspective view of a conventional alligator clip.
Figure 2:
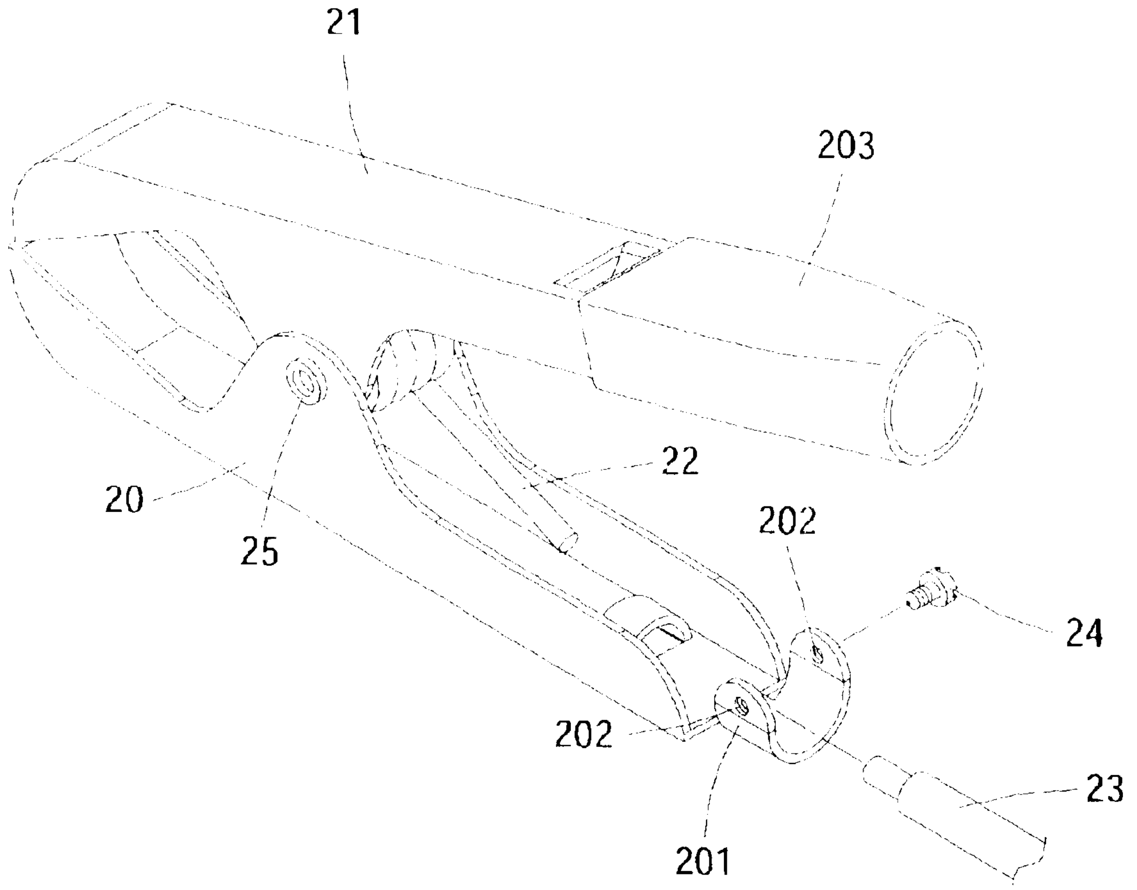
FIG. 2 shows an exploded view of the present invention.
Figure 3:
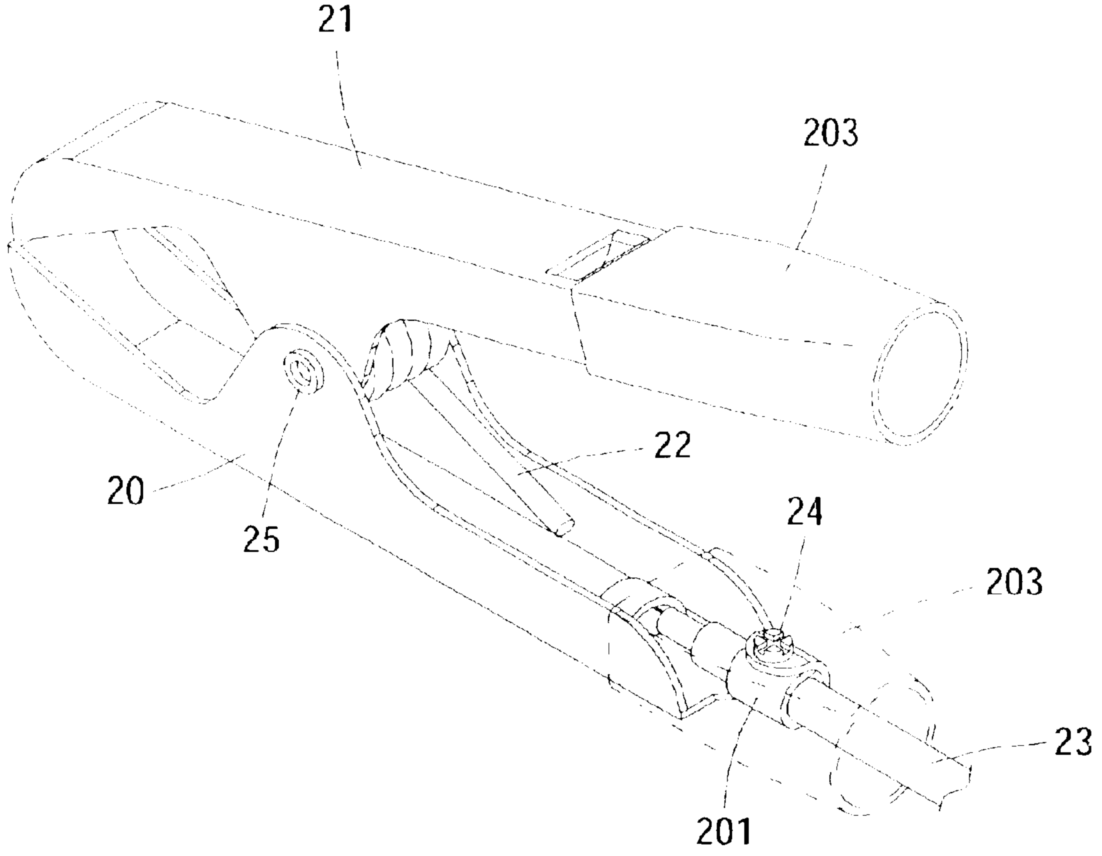
FIG. 3 shows a perspective view of the present invention.
Figure 4:
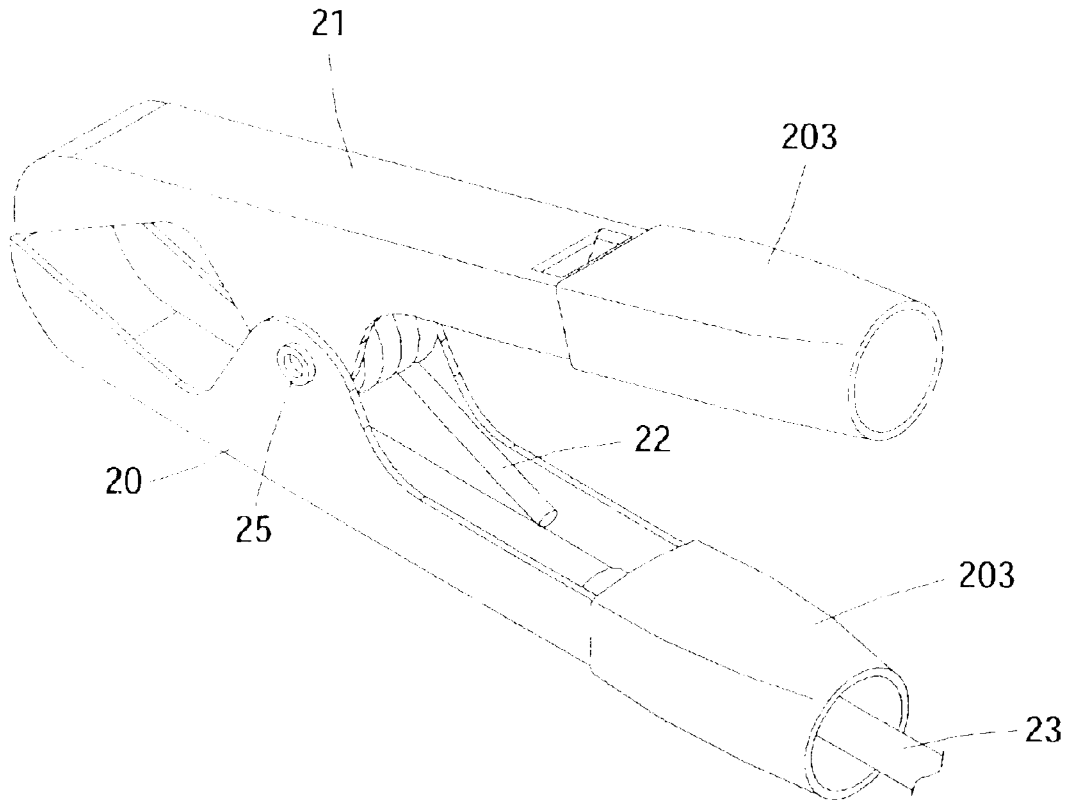
FIG. 4 shows a use condition of the present invention.
Figure 5:
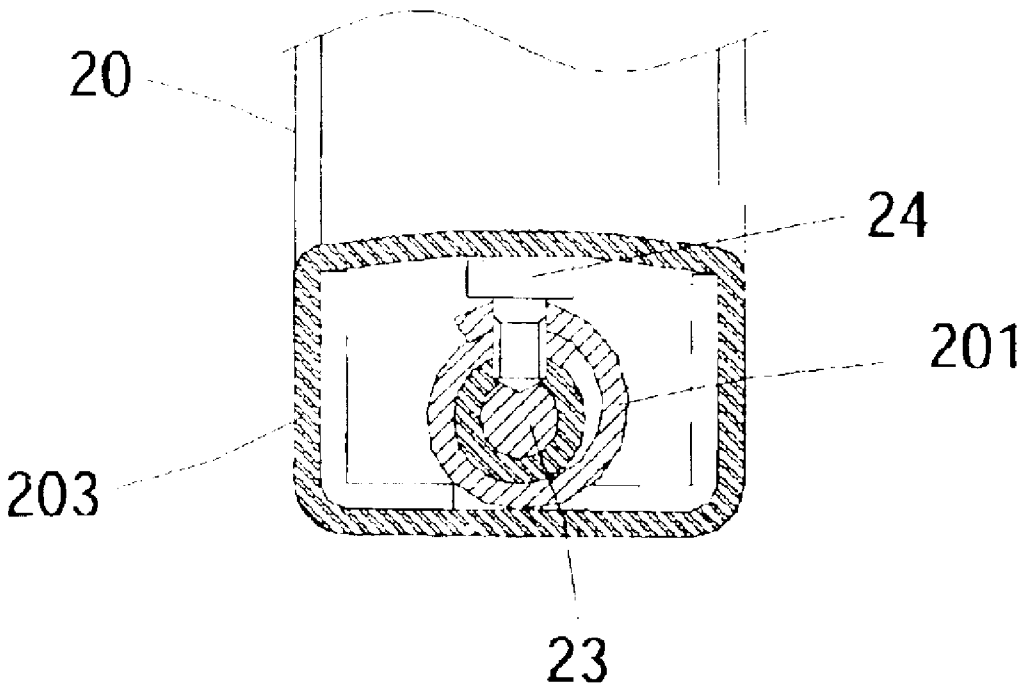
FIG. 5 shows a cross sectional view of the present invention.

As shown in FIG. 2, the present invention provides an alligator clip with improved structure, particularly a kind of alligator clip used for connecting a car battery with enhanced integral connectivity. The alligator clip comprises a first clip member 20, a second clip member 21, a resilient member 22, a power code 23 and a fixture 24.

The first clip member 20 and the second clip member 21 are pivotally connected to each other by a pin 25. The alligator clip further comprises a resilient member 22 furnished on the pivot pin 25. The resilient member 22 has two opposite ends in contact against the interior surfaces of the first and second clip members 20 and 21. Thereby, the front ends of the first and second clip members 20 and 21 are inclined to each other to provide the clipping function, and the alligator clip can thus clip the positive/negative electrode of a car battery (not shown).

The first clip member 20 has a securing member 201 formed from the bottom end to wrap the power cord 23 to be fixed thereon.

Referring to FIGS. 2–5, with one through hole 202 on the each side of the securing member 201, the securing member 201 can wrap the power cord 23 so that two holes 202 could be matched correspondingly in the up and bottom position. Thus a fixture 24 such as a screw or a bolt can pass though the holes 202 to fixedly secure the securing member 201 on an exposed end of the power code 23. An insulation cap 203 can be used to be mounted on the bottom end of the first clip to enclose the securing member 201 to provide stable connectivity and increase safety.

According to the above, the alligator clip structure provided by the present invention comprises at least the following advantages:

(1) The screw fixture mounting enhances overall connection strength.

(2) The structural improvement provides the convenience of quicker disassemble, quicker assemble and easier power code replacement.

This disclosure provides exemplary embodiments of a child safety blind. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. An alligator clip comprising a first clip member and a second clip member connected to each other by a pivot pin, and a resilient member furnished on the pivot pin with two opposite ends in contact against respective surfaces of the first and second clip members so as to clip a positive/negative electrode of a car battery, the alligator clip being characterized by:

a securing member formed on a bottom end of the first clip member, comprising a through hole each on two opposite ends to wrap a power cord so that the two through holes are aligned and receive a fixture to secure the securing member on the power cord.

2. The alligator clip according to claim 1, wherein the fixture is a screw.

3. The alligator clip according to claim 1, wherein the fixture is a bolt.

4. The alligator clip according to claim 1, further comprising an insulation cap mounted on the bottom end of the first clip to enclose the securing member.

* * * * *